Jan. 23, 1962 G. F. VANDERSCHMIDT 3,018,435
MEASURING
Filed Oct. 15, 1958
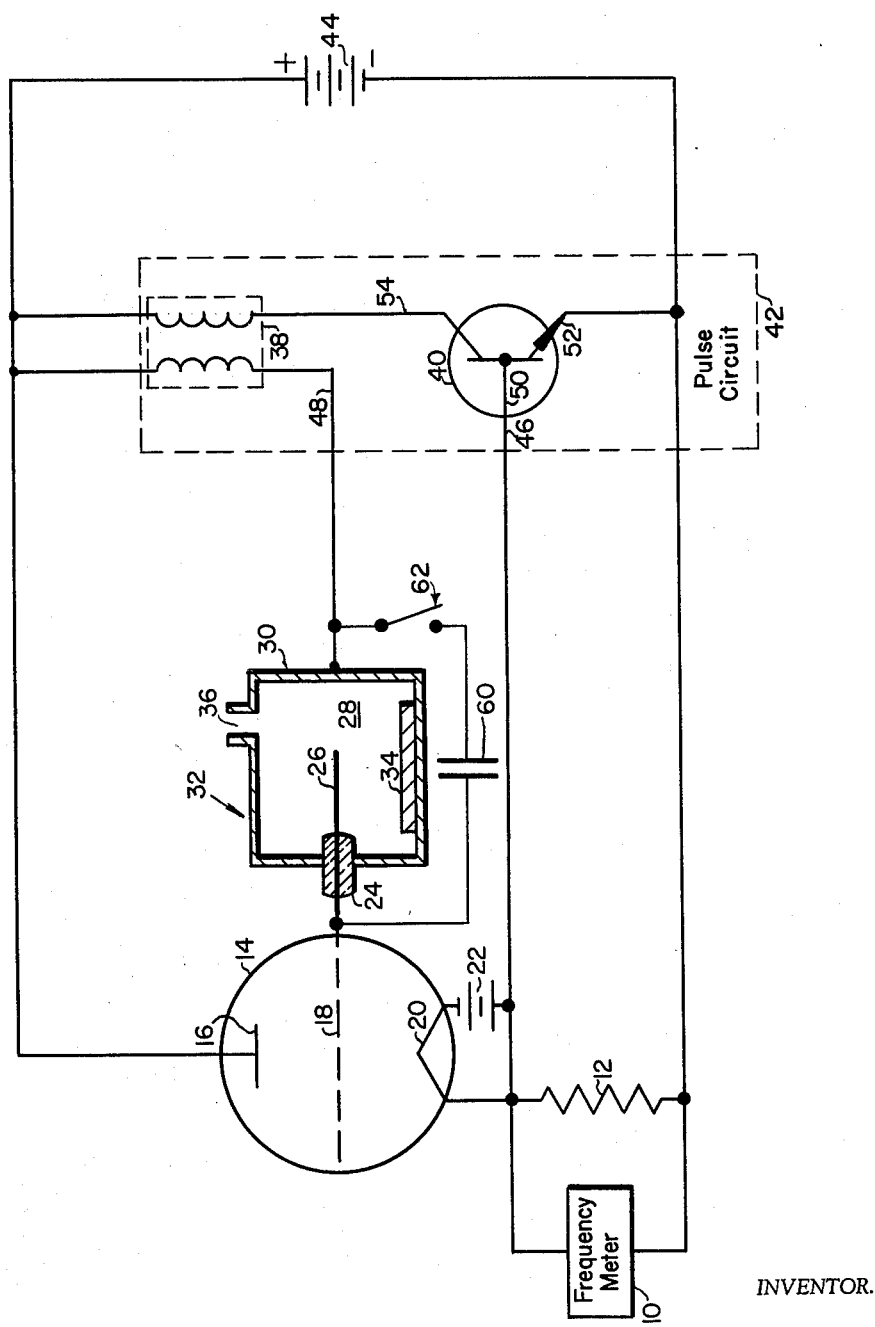
INVENTOR.
BY George F. Vanderschmidt
Oliver W. Hayes

United States Patent Office 3,018,435
Patented Jan. 23, 1962

3,018,435
MEASURING
George F. Vanderschmidt, Cambridge, Mass., assignor to National Research Corporation, Cambridge, Mass., a corporation of Massachusetts
Filed Oct. 15, 1958, Ser. No. 767,312
7 Claims. (Cl. 324—33)

This invention relates to an improvement in the ionization gauge described in my copending application Serial Number 699,860, filed November 29, 1957. In this gauge, a capacitor is charged or discharged at a rate dependent upon the rate of ion production occurring in an ion chamber. The invention is particularly directed to an improved system for effecting the recharging of the ion chamber capacitor subsequent to the partial neutralization of the charge on the ion chamber capacitor by the ion current.

The principal object of the invention is to provide an apparatus for efficiently and quickly measuring a wider range of gas pressures than has heretofore been possible using the capacitor discharge method.

Another object of this invention is to produce a rugged apparatus for recharging a capacitor in an ion chamber circuit in a minimum amount of time.

Other objects of the invention will in part be obvious and will in part appear hereinafter.

The invention accordingly comprises the apparatus possessing the construction, combination of elements, and arrangement of parts which are exemplified in the following detailed disclosure and accompanying drawing, and the scope and application of which will be indicated in the claims.

In my copending application Serial Number 699,860, the gauge described includes an electrometer tube, an ion chamber, a trigger circuit, a relay, and a counting rate meter. The grid of the tube is connected to the negative electrode of an ion chamber. The chamber is designed to act as a capacitor and is charged by a negative voltage applied to the ion chamber inner electrode by means of a relay and a voltage source. The relay is periodically closed by a pulse from a trigger circuit actuated by a rise in the cathode voltage of the electrometer tube when the tube begins to conduct.

In the case of the present invention the grid of the electrometer tube is also connected to the inner and more negative of the two electrodes in the chamber. However, the grid and inner more negative electrode of the ion chamber are substantially completely isolated from other parts of the circuit and from ground, so that the node comprising the grid and inner more negative electrode is capable of holding a negative electrostatic charge. The capacitance of the ion chamber causes the negative electrode and grid potential to rise with respect to the electrometer tube cathode whenever a positive potential is applied to the chamber wall. A pulse supplied by the pulse circuit tends to place a positive voltage on the chamber wall. The higher voltage on the ion chamber wall acts to raise grid potential and permits grid current to flow and electrons to collect on the grid, thereby creating a negative electrostatic charge on the inner electrode of the chamber. The charging time should be small to allow for more accurate readings at high pressure, as will be explained below.

The charging rate is limited by the amount of current provided by the thermionic cathode, the tube characteristics, and the delays inherent in the circuit.

The electrons present in the space charge surrounding the cathode provide a ready source of current and these electrons effectively clamp the grid near cathode potential, although the grid is being induced to a more positive potential by the voltage of the ion chamber, and the electrons in the space charge provide an extremely large residual source of current for short period peak currents or pulses. This ready source of current makes the charging time of the ion chamber short.

Thus, when the charging voltage is removed, the ion chamber is charged to an amount approximately equal to the amplitude of the pulse. When the charging voltage is removed, the outer wall voltage drops. The ion chamber acts as a capacitor and the node comprising the inner electrode and the grid now becomes negative with respect to the more positive outer electrode of the ion chamber by an amount approximately equal to the amplitude of the pulse. The grid of the electrometer tube is driven sufficiently negative with respect to the cathode so that plate current is cut off or substantially reduced.

Positive ions formed from the gas in the ion chamber during the operation of the chamber are attracted to the negative electrode and upon arriving at the negative electrode, reduce the negative charge on that electrode. The voltage across the electrode pair therefore falls at a rate which is proportional to the rate of ionization in the chamber.

When the ion chamber voltage has fallen a predetermined amount, then the negative grid bias is raised sufficiently so that plate current in the electrometer tube will flow. The rise in potential across a cathode resistor acts as a signal voltage which causes the pulse circuit to be actuated. Then the cycle is completed and repeats.

Referring to the diagram, basically it includes an electrometer tube 14, an ion chamber 32, a pulse circuit 42 and a frequency meter 10.

The electrometer vacuum tube 14 is preferably composed of three electrodes comprising a plate 16, a grid 18, and a cathode 20. The cathode is heated by a suitable voltage source such as a battery 22. The plate voltage is supplied by a D.C. voltage source 44 which is connected to the plate 16.

Grid 18 of tube 14 is connected to the inner negative electrode 26 of ion chamber 32. Grid 18 and negative electrode 26 are isolated from the other electrical elements except for the capacitance of chamber 32. The positive electrode 30 of ion chamber 32 is isolated from negative electrode 26 by an insulator 24 and space 28. Gas may be admitted to chamber 32 through opening 36. Ions are present in space 28 due to radiation from radioactive source 34 or due to any substituted, ionization agent. Positive electrode 30 of ion chamber 32 is connected to the output terminal 48 of pulse circuit 42. Frequency meter 10 is connected across a cathode resistor 12. The input terminal 46 of pulse circuit 42 is electrically connected to the cathode 20 of the electrometer tube 14.

Pulse circuit 42 operates as a blocking oscillator. It preferably comprises a transistor 40, a transformer 38, an input terminal 46 connected to the secondary of transformer 38 which is connected to the plate power supply 44, and an output terminal 48. The transistor collector 54 is connected to the primary of transformer 38 which is connected to power supply 44. The emitter 52 of transistor 40 is connected to ground.

In general, the blocking oscillator pulses when the voltage of the base 50 rises above ground potential. The voltage of collector 54 is more positive than the voltage of base 50. The voltage from collector 54 to base 50 causes current flow in the collector branch of the circuit through the primary winding of transformer 38. The current in the primary winding of transformer 38 induces a voltage in the secondary winding of transformer 38 due to the mutual inductance between the windings. This secondary voltage has a polarity such that it raises the potential of the chamber wall 30 with respect to ground.

The capacitance between the chamber electrodes 26 and 30 causes the increase of potential upon the outer wall 30 to cause an equal net increase in the potential of the inner and more negative electrode 26. The grid 18 is connected to the inner electrode 26 so it is at the same potential as the inner electrode 26. The rise in voltage of grid 18 will cause an increased flow of plate current. The plate current through the cathode resistor 12 of the cathode follower circuit shown will cause a rise with respect to ground in the voltage of transistor base 50. The voltage rise in the components of the circuit will continue until the transformer 38 or the transistor 40 becomes saturated. When saturation occurs, the voltage induced in the secondary winding of transformer 38 will decrease and the grid voltage connected through the capacitance of the ion chamber 32 to the secondary of transformer 38 will also decrease. The grid voltage will fall to a value near ground potential or more negative. The plate current in tube 14 may be cut off. The total effect is a voltage pulse measurable throughout the circuit. The charge built up upon the electrodes of chamber 32 will be measurable as a voltage and when the pulse produced by the blocking oscillator 42 is no longer present, the grid 18 will be lowered considerably in potential below the voltage at which grid current flows by an amount approximately equal to the pulse voltage.

The rest of the circuit operates in the general manner described below. Initially, assume that the ion chamber 32 is uncharged and the voltage of grid 18 is above cut-off so that plate current flows. Due to current through the cathode resistor 12, a rise in cathode voltage with respect to ground is produced. Cathode potential is introduced to the pulse circuit 42 through input terminal 46. The voltage at terminal 46 actuates the transistor blocking oscillator pulse circuit 42 and a large positive pulse appears across the output terminal 48 and the cathode 20. The positive electrode 30 of the ion chamber 32 is raised in potential with respect to ground by an amount approximately equal to the pulse. The capacitance between the two ion chamber electrodes 26 and 30 causes the negative electrode 26 to tend to the most positive potential possible. The voltage of the cathode 20 rises due to increased plate current, but grid voltage rises slightly more. Grid 18 immediately receives large quantities of electrons from cathode 20 and from the space charge surrounding cathode 20. This large current will pass through grid 18 to negative electrode 26 of ion chamber 32 and will charge chamber 32 to a voltage approximately equal to the pulse voltage amplitude. When the pulse, which is usually 50–100 micro-seconds long, terminates, the positive electrode 30 is substantially reduced in potential to the potential on battery 44. The negative electrode 26 is reduced in potential by an amount approximately equal to the pulse amplitude due to the capacitance coupling between electrodes 26 and 30. Grid 18 is commensurately reduced in potential and the plate current is cut off.

Ions in space 28 are thereafter collected by the electrodes and thereby discharge ion chamber 32. When the grid potential again rises above cutoff voltage, the plate current will flow again and the cycle will repeat. The number of repetitions per second of this cycle will depend upon the rate of production of ions in ion chamber 32. The frequency meter will measure the number of pulses per second. It may be a digital device, an R.M.S. meter, or any convenient frequency meter.

A blocking oscillator is only one form of the general types of trigger and pulse circuits which are presently known. It is obvious that any pulse circuit may be used. The blocking oscillator shown here uses the chamber and the tube as part of its operation but a more independent circuit might be used such as a thyratron with on-off firing. The circuit shown in the drawing is a preferred embodiment of the invention.

Another type of circuit comprises one wherein a capacitor type ion chamber and an electrometer tube are inserted into a multivibrator circuit. The ion chamber is then used as one of the grid-to-plate capacitors to determine the time constant for the dissipation of the negative potential on one grid.

So that the discharge time will always depend upon the rate of ionization in the chamber, the ion chamber should always be charged to a particular potential. In order to obtain better wave shapes and sharper pulses, pulse shaping networks may be incorporated. Such a pulse shaping network assures uniformity of pulse shape and hence of operation of the circuit. Then, when the rate of ionization remains constant, the discharge time will not fluctuate due to changes in supply voltage or the characteristics of the electrical elements. If it is desired to change the time constant of the ion chamber, an additional capacitor 60 can be provided in parallel with the ion chamber capacitance by closing the switch 62.

While the invention has been described primarily in connection with its preferred use as a density measuring device, it is equally applicable in numerous other systems where ionization of a gas is to be measured. One such system is a flowmeter of the type described in U.S. Patent 2,611,268. Another use is in a chromatography detector of the type described in the copending application of Roehrig, Serial No. 748,658, filed July 15, 1958. Accordingly the invention is not to be considered only in the narrow light of the preferred embodiment described herein.

Since certain changes may be made in the above apparatus without departing from the scope of the invention herein involved, it is intended that all matter contained in the above description, or shown in the accompanying drawings, shall be interpreted as illustrative, and not in a limiting sense.

What is claimed is:

1. An ionization gauge comprising an ion chamber containing a negative electrode for collecting positive ions, a positive electrode for collecting negative ions, and an ionization agent, an electrometer tube having a grid, cathode, and plate, and a direct current voltage source maintaining said plate at a positive potential with respect to said cathode, said grid being connected to said negative electrode, said grid and said negative electrode being substantially completely insulated from ground, so that the node comprising the grid and negative electrode retains a negative electrostatic charge, means for capacitively applying to said node a pulse which is positive with respect to said cathode to cause electrons to be collected by said grid from said cathode so that the ion chamber is caused to store an electrostatic charge and said grid assumes a large negative voltage when said positive pulse is removed, said means for applying said positive pulse being energized when said large negative voltage on the grid is decreased a predetermined amount by the collection of positive ions by said negative electrode, said means for applying said pulse comprising a pulse forming circuit capable of generating a pulse having a duration which is substantially shorter than the time during which the large negative grid voltage normally remains on said electrometer tube, and means for measuring the frequency of application of said large potential difference.

2. The apparatus of claim 1 wherein a capacitor is connected between said node and a voltage source.

3. The apparatus of claim 1 wherein the ionizing agent is a source of radioactive material.

4. The apparatus of claim 1 wherein the pulse forming circuit is a blocking oscillator.

5. The apparatus of claim 1 wherein the gauge is arranged to indicate the density of the gas being ionized.

6. The apparatus of claim 1 wherein the gauge is arranged to indicate the pressure of the gas being ionized.

7. The apparatus of claim 1 wherein an additional capacitor is provided in parallel with the capacitance of the ion chamber.

References Cited in the file of this patent

UNITED STATES PATENTS

| | | |
|---|---|---|
| 2,531,144 | Manley | Nov. 21, 1950 |
| 2,634,609 | Obermaier | Apr. 14, 1953 |
| 2,728,861 | Glass | Dec. 27, 1955 |
| 2,874,305 | Wilson et al. | Feb. 17, 1959 |
| 2,876,360 | Victoreen | Mar. 3, 1959 |

FOREIGN PATENTS

| | | |
|---|---|---|
| 852,257 | France | Oct. 23, 1939 |